United States Patent [19]
Sato

[11] Patent Number: 6,002,784
[45] Date of Patent: Dec. 14, 1999

[54] APPARATUS AND METHOD FOR DETECTING FEATURES OF A FINGERPRINT BASED ON A SET OF INNER PRODUCTS CORRESPONDING TO A DIRECTIONAL DISTRIBUTION OF RIDGES

[75] Inventor: Atsushi Sato, Tokyo, Japan

[73] Assignee: NEC Corporation, Tokyo, Japan

[21] Appl. No.: 08/731,265

[22] Filed: Oct. 11, 1996

[30] Foreign Application Priority Data

Oct. 16, 1995 [JP] Japan ................................. 7-266661

[51] Int. Cl.⁶ ........................................... G06K 9/00
[52] U.S. Cl. ........................................... 382/124
[58] Field of Search .................... 382/124, 125, 382/190, 197; 356/71

[56] References Cited

U.S. PATENT DOCUMENTS

| | | | |
|---|---|---|---|
| 5,497,429 | 3/1996 | Shibuya | 382/125 |
| 5,524,161 | 6/1996 | Omori et al. | 382/125 |
| 5,608,811 | 3/1997 | Kamei | 382/124 |
| 5,659,626 | 8/1997 | Ort et al. | 382/125 |

OTHER PUBLICATIONS

Noda et al, "Automated Fingerprint Classifier", Proceedings of 2nd International Pattern Recognition Conference, Aug. 1974, pp. 21–30.

Nakamura et al, "Fingerprint Classification by Directional Distribution Patterns", IEICE, vol. J65–D, No. 10, Oct. 1982, pp. 1286–1293.

J.E. Gaffney, "Pattern Orientation Scheme", IBM Technical Disclosure Bulletin, vol. 9, No. 6, Nov. 1966, p. 633.

S. Ohteru et al., "Automated fingerprint classifier", IEEE Proc. of the 2nd Int. Joint Conf. on Pattern Recognition, vol. Proc. 2, Aug. 13, 1974, Copenhagen, pp. 185–189.

C.B. Shelman et al., "Fingerprint Research At Argonne National Laboratory", Proceedings of the Carnahan Conference on Electronic Crime Countermeasures, Apr. 25, 1973, pp. 108–113.

F. You et al., "Fingerprint Pattern Recognition For Medical Uses—A Frequency Domain Approach", Proceedings of the Northeast Bioengineering Conference, Newark, Mar. 18–19, 1993, Conf. 19, pp. 176–177.

*Primary Examiner*—Andrew W. Johns
*Attorney, Agent, or Firm*—Foley & Lardner

[57] ABSTRACT

Detection of a fingerprint feature is performed on the basis of a directional distribution of a fingerprint obtained by setting a plurality of points on a circle having a center corresponding to a mark point on a directional pattern of ridges, obtaining inner products of vectors indicating tangent lines and vectors indicating ridges at the respective points and providing a distribution of the inner products as a directional distribution of ridges. As a first method, a Fourier expansion unit Fourier-expands the directional distribution of ridges and outputs Fourier coefficients for every frequency component, a power calculation unit calculates power of every frequency component on the basis of the Fourier coefficients, and a power determination unit detects the fingerprint feature on the basis of the power of every frequency component. As a second method, a smoothing unit divides the directional distribution of ridges into a plurality of parallel distributions and smoothes the respective partial distributions, and a zero cross detection unit detects the number of changes of value of the plurality of the smoothed partial distributions from positive to negative or negative to positive as the number of zero crossings, and detects the fingerprint feature on the basis of the number of zero crossings.

18 Claims, 14 Drawing Sheets

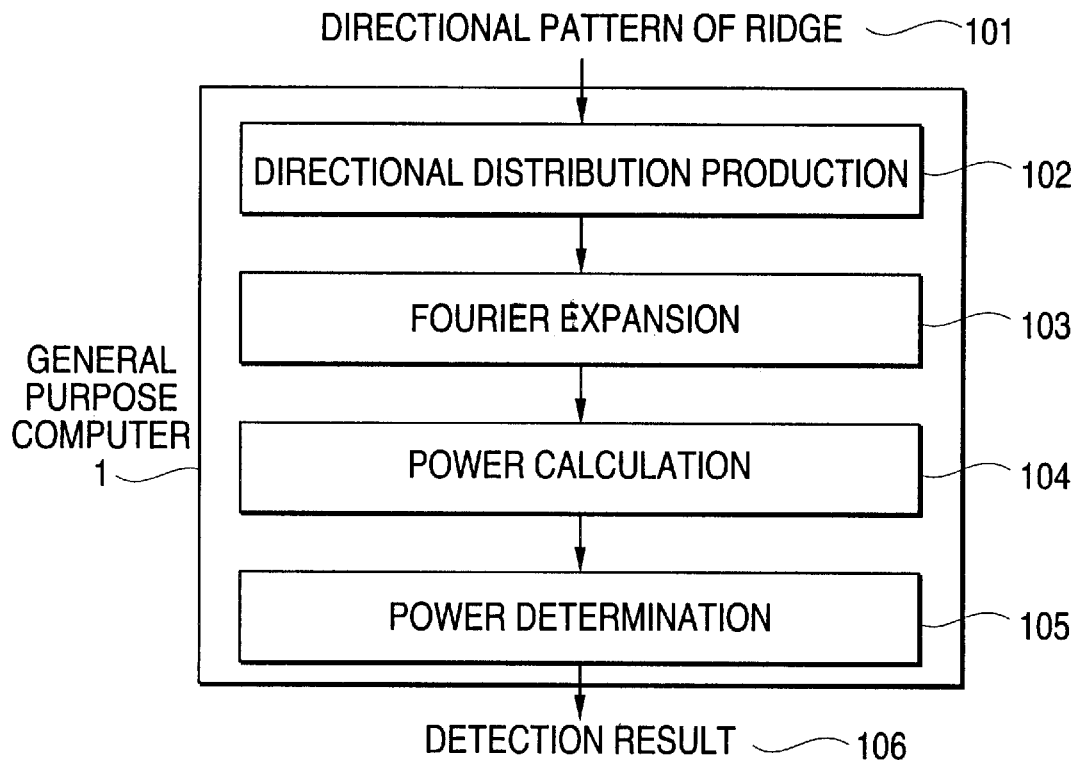
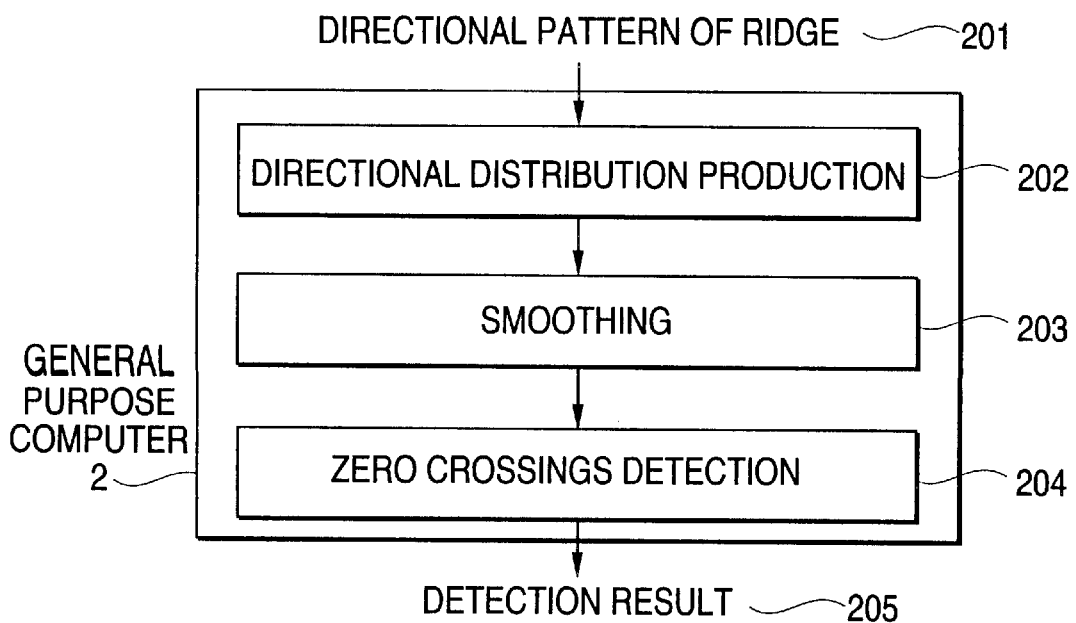

FIG. 5
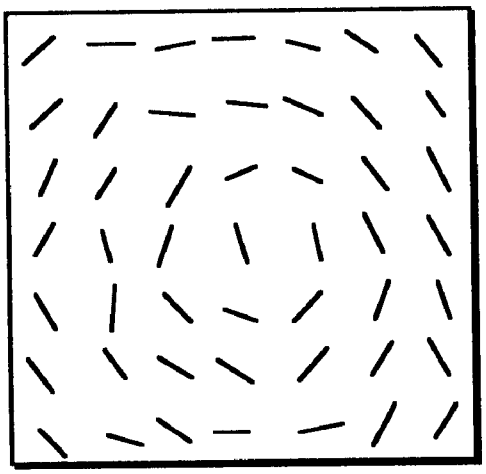
WHORL
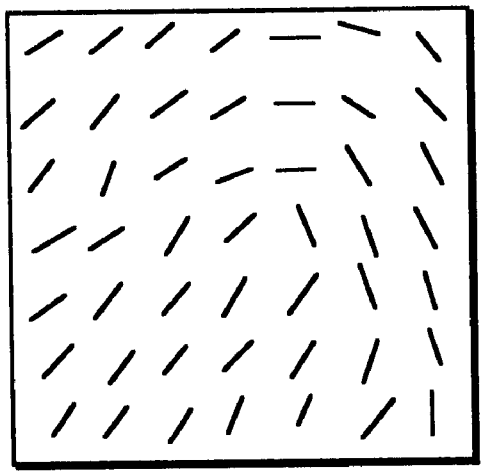
LOOP
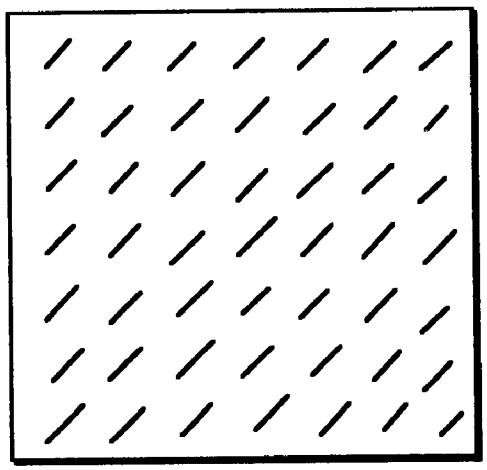
PERIPHERY
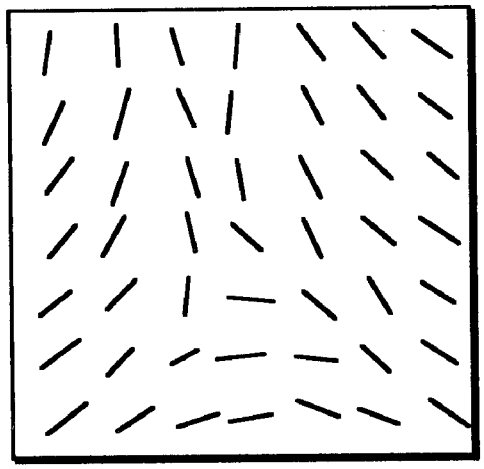
DELTA

| 0 | $\frac{5}{13}$ | $\frac{4}{5}$ | 1 | $\frac{4}{5}$ | $\frac{5}{13}$ | 0 |
|---|---|---|---|---|---|---|
| $-\frac{5}{13}$ | 0 | $\frac{3}{5}$ | 1 | $\frac{3}{5}$ | 0 | $-\frac{5}{13}$ |
| $-\frac{4}{5}$ | $-\frac{3}{5}$ | 0 | 1 | 0 | $-\frac{3}{5}$ | $-\frac{4}{5}$ |
| -1 | -1 | -1 | 0 | -1 | -1 | -1 |
| $-\frac{4}{5}$ | $-\frac{3}{5}$ | 0 | 1 | 0 | $-\frac{3}{5}$ | $-\frac{4}{5}$ |
| $-\frac{5}{13}$ | 0 | $\frac{3}{5}$ | 1 | $\frac{3}{5}$ | 0 | $-\frac{5}{13}$ |
| 0 | $\frac{5}{13}$ | $\frac{4}{5}$ | 1 | $\frac{4}{5}$ | $\frac{5}{13}$ | 0 |

FIG. 12

| $-1$ | $-\frac{12}{13}$ | $-\frac{3}{5}$ | $0$ | $\frac{3}{5}$ | $\frac{12}{13}$ | $1$ |
|---|---|---|---|---|---|---|
| $-\frac{12}{13}$ | $-1$ | $-\frac{4}{5}$ | $0$ | $\frac{4}{5}$ | $1$ | $\frac{12}{13}$ |
| $-\frac{3}{5}$ | $-\frac{4}{5}$ | $-1$ | $0$ | $1$ | $\frac{4}{5}$ | $\frac{3}{5}$ |
| $0$ | $0$ | $0$ | $0$ | $0$ | $0$ | $0$ |
| $\frac{3}{5}$ | $\frac{4}{5}$ | $1$ | $0$ | $-1$ | $-\frac{4}{5}$ | $-\frac{3}{5}$ |
| $\frac{12}{13}$ | $1$ | $\frac{4}{5}$ | $0$ | $-\frac{4}{5}$ | $-1$ | $-\frac{12}{13}$ |
| $1$ | $\frac{12}{13}$ | $\frac{3}{5}$ | $0$ | $-\frac{3}{5}$ | $-\frac{12}{13}$ | $-1$ |

FIG. 13

| 10 | 11 | 11 | 12 | 13 | 13 | 14 |
|---|---|---|---|---|---|---|
| 9 | 10 | 11 | 12 | 13 | 14 | 15 |
| 9 | 9 | 10 | 12 | 14 | 15 | 15 |
| 8 | 8 | 8 |  | 0 | 0 | 0 |
| 7 | 7 | 6 | 4 | 2 | 1 | 1 |
| 7 | 6 | 5 | 4 | 3 | 2 | 1 |
| 6 | 5 | 5 | 4 | 3 | 3 | 2 |

FIG. 16
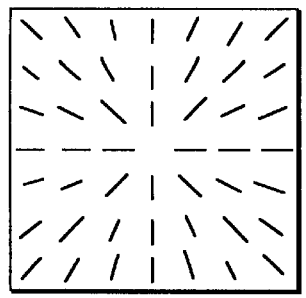
FIG. 17
DIRECTIONAL PATTERN OF RIDGE —— 301
↓
DIRECTIONAL DISTRIBUTION PRODUCTION —— 302
↓
DISTANCE CALCULATION —— 303
↓
DISTANCE DETERMINATION —— 304
↓
DETECTION RESULT —— 305
FIG. 18
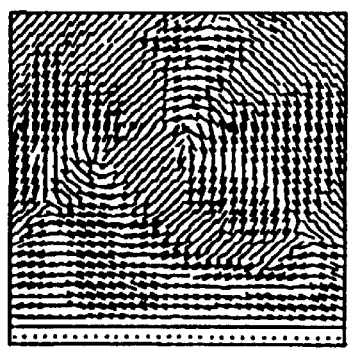

WHORL   LOOP

DELTA   PERIPHERY

APPARATUS AND METHOD FOR DETECTING FEATURES OF A FINGERPRINT BASED ON A SET OF INNER PRODUCTS CORRESPONDING TO A DIRECTIONAL DISTRIBUTION OF RIDGES

BACKGROUND OF THE INVENTION

1. Field of the Invention

The present invention relates to an apparatus and method of classifying and extracting features of a fingerprint or palm print and, particularly, to a fingerprint feature detecting apparatus and method for detecting features of a fingerprint.

2. Description of the Related Art

Examples of a prior art method of detecting features of a fingerprint using a computer is disclosed in a paper entitled "Automated Fingerprint Classifier" by F. Noda, S. Ohteru, H. Kobayashi and T. Kato, published in the Proceedings of 2nd International Pattern Recognition Conference, August, 1974 and in a paper entitled "Fingerprint Classification by Directional Distribution Patterns" by O. Nakamura, K. Goto and T. Minami, published in the Transaction of the Institute of Electronics, Information and Communication Engineers, Vol. J65-D, No. 10, October 1982, pp. 1286–1293.

In the former example which will be referred to as the Noda et al method, a fingerprint is considered as a vector field and a feature thereof is detected by performing a surface integral of divergence in a local area thereof and, in the latter example which will be referred to as the Nakamura et al method, a fingerprint feature is detected by patterning a directional distribution of ridges and matching a resulting pattern with a preliminarily prepared standard pattern.

The Nakamura et al method, which is closer to the present invention than Noda et al method, will be described with reference to FIG. 17.

In the Nakamura et al method, a directional distribution pattern generating unit 302 produces a directional distribution pattern of ridges in an area around a certain mark point on a fingerprint such as shown in FIG. 18, a distance calculation unit 303 calculates a distance between the directional distribution pattern thus produced and a preliminarily produced standard pattern, and a distance determination unit 304 determines a category corresponding to the standard pattern having the minimum distance to the produced pattern.

First, a processing in the directional distribution pattern producing unit 302 will be described. As shown in FIG. 19, a circular area of the fingerprint having the mark point as a center is divided to 16 sectors and, among angles of ridge directions j with respect to a center line $L_i$ in a sector area $W_i$, small angles (not larger than 90°) are represented by $r^j_i$. An average $C_i$ of $r^j_i$ for N ridge directions contained in the sector area $W_i$ is obtained according to the following equation (1):

$$C_i = \frac{1}{N}\sum_{j=1}^{N} R_i^j \qquad \text{Equation (1)}$$

and a two dimensional directional distribution pattern of all of the 16 sectors areas is obtained by repeating this processing for all of the sectors.

The directional pattern of ridges is classified to four categories, first to third categories including feature patterns, "whorl", "loop" and "delta", respectively, and a fourth category including non-feature patterns called "periphery". The respective whorl and loop are referred to as "core". The directional distribution patterns of whorl, loop, delta and periphery are two dimensional patterns specific to the respective categories as shown in FIG. 20.

Next, a processing performed in the distance calculation unit 303 will be described. In order to classify these two dimensional patterns, it is necessary to preliminarily select feature points and peripheral portions of a directional pattern of ridges visually and prepare standard patterns $C^t$ for the respective categories. The distance calculation unit 303 calculates a distance D between the standard pattern and the directional pattern of ridges according to the following equation (2):

$$D = \min D(s); \qquad \text{Equation (2)}$$

$$s = 0, 1, 2, \ldots, 15$$

$$D(s) = \frac{1}{16}\sum_{i=0}^{16} |C_i - C^t_{1+(i+s)\bmod 16}|$$

where the letter S denotes an amount of rotation of the standard pattern in calculating the distance. That is, the minimum distance is D among a plurality of distances obtained by matching while rotating the standard pattern for every constant angle shift.

The distance determining unit 304 compares the minimum distances for these categories with each other to determine a fingerprint feature whorl, loop or delta to which the standard pattern having the minimum distance belongs, and outputs the feature thus obtained as a result 305 of the detection.

In the conventional fingerpring feature detecting method, however, it is necessary to preliminarily select a feature point visually and prepare the standard pattern by using the directional distribution pattern in the vicinity of the feature point, which is a time consuming procedure. Further, since the distance calculation is performed between quantized patterns, the distance value depends on rotation of the directional pattern of ridges, and thus the detection accuracy is degraded.

This fact will be described by employing a case of delta as a feature with reference to FIGS. 21 and 22. A directional distribution of the delta pattern includes three protrusions and three valleys each between adjacent ones of the protrusions as shown by the thick solid line in FIG. 21. The directional distribution pattern is put on the 16 sector areas and the directional distribution pattern is sampled at points indicated by the small black squares. On the other hand, when the same directional distribution pattern is rotated counterclockwise by (360/32) degrees, a directional distribution pattern shown in FIG. 22 is obtained. Then, when the directional distribution pattern thus obtained is put on an area divided to 16 sectors, the pattern is sampled at points indicated by the small black squares. Although the directional distribution patterns shown in FIGS. 21 and 22 are the same originally, the distance does not become zero even if the matching is performed while rotating in a stepwise manner one with respect to the other by a constant angle, due to the difference in sampling point between the patterns. Therefore, the distance value depends on rotation of the fingerprint and thus the detection accuracy is degraded.

An object of the present invention is to provide a fingerprint feature detecting apparatus for detecting fingerprint feature, which does not require a preliminary preparation of standard pattern, does not depend on the rotation of a directional pattern of ridges, and is capable of maintaining high detection accuracy.

Another object of the present invention is to provide a fingerprint feature detecting method for detecting a fingerprint feature, which does not require a preliminary preparation of standard pattern, does not depend on the rotation of a directional pattern of ridges, and is capable of maintaining high detection accuracy.

SUMMARY OF THE INVENTION

According to a first aspect of the present invention, a fingerprint feature detecting apparatus comprises:

first means for setting a plurality of points on a circle having a center corresponding to a mark point on a directional pattern of ridges, obtaining inner products of vectors indicating tangent lines and vectors indicating ridges at the respective points and outputting a distribution of the inner products as a directional distribution of ridges; and second means for detecting the fingerprint feature on the basis of the directional distribution of ridges.

According to a second aspect of the present invention, a fingerprint feature detecting apparatus comprises:

first means for setting a plurality of points on a circle having a center corresponding to a mark point on a directional pattern of ridges, deriving vectors indicative of tangent lines from a table storing preliminarily calculated vectors indicative of tangent lines at the respective points, obtaining inner products of the vectors indicating tangent lines and vectors indicating ridges at the respective points and outputting a distribution of the inner products as a directional distribution of ridges; and second means for detecting the fingerprint feature on the basis of the directional distribution of ridges.

According to a third aspect of the present invention, the second means of the fingerprint feature detecting apparatus according to the first aspect of the present invention comprises:

Fourier expansion means for Fourier-expanding the directional distribution of ridges and outputting Fourier coefficient every frequency component;

power calculation means for calculating power of every frequency component on the basis of the Fourier coefficients; and power determination means for detecting the fingerprint feature on the basis of the power of every frequency components.

According to a fourth aspect of the present invention, the second means of the fingerprint feature detecting apparatus according to the first aspect of the present invention comprises:

Fourier expansion means for Fourier-expanding the directional distribution of ridges and outputting Fourier coefficient every frequency component;

power calculation means for calculating power of every frequency component on the basis of the Fourier coefficients; and power determination means for detecting whorl as the fingerprint feature when the power at the frequency component of zero is maximum, detecting loop as the finterprint feature when the power at the frequency of 1 is maximum, detecting no feature when the power at the frequency component of 2 is maximum and detecting delta as the fingerprint feature when the power at the frequency component of 3 is maximum.

According to a fifth aspect of the present invention, the second means of the fingerprint feature detecting apparatus according to the first aspect of the present invention comprises:

smoothing means for dividing the directional distribution of ridges into a plurality of partial distributions and smoothing the respective partial distributions;

Fourier expansion means for Fourier-expanding the directional distribution of ridges and outputting Fourier coefficient every frequency component;

power calculation means for calculating power of every frequency component on the basis of the Fourier coefficients; and power determination means for detecting fingerprint feature on the basis of the power of the every frequency component.

According to a sixth aspect of the present invention, the second means of the fingerprint feature detecting apparatus according to the first aspect of the present invention comprises smoothing means for dividing the directional distribution of ridges into a plurality of partial distributions and smoothing the respective partial distributions;

Fourier expansion means for Fourier-expanding the directional distribution of ridges and outputting Fourier coefficient every frequency component;

power calculation means for calculating power of every frequency component on the basis of the Fourier coefficients; and power determination means for detecting whorl as the fingerprint feature when the power at the frequency component of zero is maximum, detecting loop as the fingerprint feature when the power at the frequency of 1 is maximum, detecting no feature when the power at frequency component of 2 is maximum and detecting delta as the fingerprint feature when the power at the frequency component of 3 is maximum.

According to a seventh aspect of the present invention, the second means of the fingerprint feature detecting apparatus according to the first aspect of the present invention comprises:

smoothing means for dividing the directional distribution of ridges into a plurality of partial distributions and smoothing the respective partial distributions; and zero cross detection means for detecting the number of changes of value of the plurality of the smoothed partial distributions from positive to negative or negative to positive as the number of zero crossings and detecting the fingerprint feature on the basis of the number of zero crossings.

According to an eighth aspect of the present invention, the second means of the fingerprint feature detecting apparatus according to the first aspect of the present invention comprises:

smoothing means for dividing the directional distribution of ridges into a plurality of partial distributions and smoothing the respective partial distributions; and zero cross detection means for detecting the number of changes of value of the plurality of the smoothed partial distributions from positive to negative or negative to positive as the number of zero crossing, and detecting whorl as the fingerprint feature when the number of zero crossings is zero, detecting loop as the fingerprint feature when the number of zero crossings is 1, detecting no feature when the number of zero crossings is 2 and detecting delta as the fingerprint feature when the number of zero crossings is 3.

According to a ninth aspect of the present invention, a fingerprint feature detecting method comprises:

a first step of setting a plurality of points on a circle having a center corresponding to a mark point on a directional pattern of ridges, obtaining inner products of vectors indicating tangent lines and vectors indicating ridges at the respective points and outputting a distribution of the inner products as a directional distribution of ridges; and a second step of detecting the fingerprint feature on the basis of the directional distribution of ridges.

According to a tenth aspect of the present invention, a fingerprint feature detecting method comprises:

a first step of setting a plurality of points on a circle having a center corresponding to a mark point on a directional pattern of ridges, deriving vectors indicative of tangent lines from a table storing preliminarily calculated vectors indicative of tangent lines at the respective points, obtaining inner products of the vectors indicating tangent lines and vectors indicating ridges at the respective points and outputting a distribution of the inner products as a directional distribution of ridges; and a second step of detecting the fingerprint feature on the basis of the directional distribution of ridges.

According to an eleventh aspect of the present invention, the second step of the fingerprint feature detecting method according to the ninth aspect of the present invention comprises:

a Fourier expansion step of Fourier-expanding the directional distribution of redges and outputting Fourier coefficient every frequency component;

a power calculation step of calculating strength of every frequency component on the basis of the Fourier coefficients; and a power determination step of detecting the fingerprint feature on the basis of the power of every frequency components.

According to a twelfth aspect of the present invention, the second step of the fingerprint feature detecting method according to the ninth aspect of the present invention comprises:

a Fourier expansion step of Fourier-expanding the directional distribution of ridges and outputting Fourier coefficient every frequency component;

a power calculation step of calculating power of every frequency component on the basis of the Fourier coefficients; and a power determination step of detecting whorl as the fingerprint feature when the power at the frequency component of zero is maximum, detecting loop as the fingerprint feature when the power at the frequency of 1 is maximum, detecting no feature when the power at the frequency component of 2 is maximum and detecting delta as the fingerprint feature when the power at the frequency component of 3 is maximum.

According to a thirteenth aspect of the present invention, the second step of the fingerprint feature detecting method according to the ninth aspect of the present invention comprises:

a smoothing step of dividing the directional distribution of ridges into a plurality of partial distributions and smoothing the respective partial distributions;

a Fourier expansion step of Fourier-expanding the directional distribution of ridges and outputting Fourier coefficient every frequency component;

a power calculation step of calculating power of every frequency component on the basis of the Fourier coefficients; and a power determination step of detecting fingerprint feature on the basis of the power of the every frequency component.

According to a fourteenth aspect of the present invention, the second step of the fingerprint feature detecting method according to the ninth aspect of the present invention comprises:

a smoothing step of dividing the directional distribution of ridges into a plurality of partial distributions and smoothing the respective partial distributions;

a Fourier expansion step of Fourier-expanding the directional distribution of land lines and outputting Fourier coefficient every frequency component;

a power calculation step of calculating power of every frequency component on the basis of the Fourier coefficients; and a power determination step of detecting whorl as the fingerprint feature when the power at the frequency component of zero is maximum, detecting loop as the fingerprint feature when the power at the frequency of 1 is maximum, detecting no feature when the power at the frequency component of 2 is maximum and detecting delta as the fingerprint feature when the power at the frequency component of 3 is maximum.

According to a fifteenth aspect of the present invention, the second step of the fingerprint feature detecting method according to the ninth aspect of the present invention comprises:

a smoothing step of dividing the directional distribution of ridges into a plurality of partial distributions and smoothing the respective partial distributions; and a zero cross detection step of detecting the number of changes of value of the plurality of the smoothed partial distributions from positive to negative or negative to positive as the number of zero crossings and detecting the fingerprint feature on the basis of the number of zero crossings.

According to a sixteenth aspect of the present invention, the second step of the fingerprint feature detecting method according to the ninth aspect of the present invention comprises:

a smoothing step of dividing the directional distribution of ridges into a plurality of partial distributions and smoothing the respective partial distributions; and a zero cross detection step of detecting the number of changes of value of the plurality of the smoothed partial distributions from positive to negative or negative to positive as the number of zero crossings, and detecting whorl as the fingerprint feature when the number of zero crossings is zero, detecting loop as the fingerprint feature when the number of zero crossings is 1, detecting no feature when the number of zero crossings is 2 and detecting delta as the fingerprint feature when the number of zero crossings is 3.

BRIEF DESCRIPTION OF THE DRAWINGS

Other features and advantages of the present invention will become more apparent from the detailed description hereunder taken in conjunction with the accompanying drawings, in which:

FIG. 1 is a block diagram of a first embodiment of the present invention;

FIG. 2 is a block diagram of a second embodiment of the present invention;

FIG. 5 shows directional patterns of land lines of fingerprints;

FIG. 12 is another table for explaining operations and effects of the embodiments of the present invention;

FIG. 13 is another table for explaining operations and effects of the embodiments of the present invention;

FIG. 16 is a diagram for explaining the effects of the embodiments of the present invention;

FIG. 17 is a block diagram of a prior art apparatus;

FIG. 18 shows a directional pattern of land lines of a fingerprint;

DETAILED DESCRIPTION OF THE PREFERRED EMBODIMENTS

Figure 3:
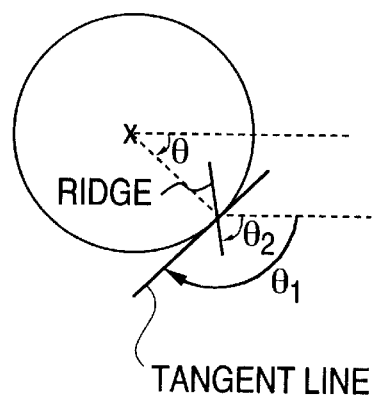
FIG. 3 is a diagram for illustrating a working of the present invention.

Embodiments of the present invention will be described with reference to the drawings.

Referring to FIG. 1, a fingerprint feature detecting apparatus 1 according to a first embodiment of the present invention for implementing a method of detecting a fingerprint feature is composed of, for example, a general-purpose computer and programs. The apparatus 1 detects a fingerprint feature (core, delta) from a directional pattern 101 of ridges. That is, the first embodiment of the present invention for detecting the fingerprint features comprises a directional distribution producing unit 102 for selecting a plurality of points on a circle having a mark point on the directional pattern 101 of the ridges as a center point, obtaining inner products of tangent vectors at the plurality of points and ridge vectors at the same points and outputting a distribution of the inner products at the points on the circle as a directional distribution of the ridges, and a fingerprint feature detection unit for detecting the fingerprint feature on the basis of the directional distribution of the ridges. The unit 102 is implemented by a program for instance.

The fingerprint feature detection unit comprises a Fourier expansion unit 103 for Fourier-expanding the directional distribution of ridges and outputting a result of Fourier expansion for every frequency component, a power calculation the unit 104 for calculating power of the Fourier-expanded directional distribution for every frequency component, and a power determination unit 105 for detecting the fingerprint feature from the calculated power for every frequency component and outputting the detected fingerprint feature as a detection result 106.

That is, the directional distribution producing unit 102 sets a point on a circle having a mark point as its center and produces a directional distribution of ridges by obtaining inner products of tangent directions at the point and ridges at the same point while rotating the point in a stepwise manner. The power calculation unit 104 obtains power of the Fourier-expanded directional distribution for every frequency component. The power determination unit 105 detects the fingerprint feature (core, delta) by comparing the power for the respective frequency components. Each of the units 103, 104 and 105 is implemented by a program for instance.

Referring to FIG. 2, a fingerprint feature detecting apparatus 2 according to a second embodiment of the present invention for implementing the method of detecting fingerprint feature is composed of, for example, a general-purpose computer and programs. The apparatus 2 includes a directional distribution producing unit 202 which operates in a similar manner to the directional distribution producing unit 102 shown in FIG. 1. That is, the directional distribution producing unit 202 selects a plurality of points on a circle having a mark point on the directional pattern 201 of the ridges as a center point, obtains inner products of tangent vectors at the plurality of the points and ridge vectors at the same points, and outputs a distribution of the inner products at the points on the circle as a directional distribution of the ridges. The unit 202 is implemented by a program for instance.

The fingerprint feature detection apparatus shown in FIG. 2 includes a fingerprint feature detection unit for detecting the fingerprint feature (core, delta) on the basis of the directional distribution of the ridges. The fingerprint feature detection unit comprises a smoothing unit 203 for smoothing the respective partial distributions and a zero crossing detection unit 204 for detecting the number of changes of values of the smoothed partial distributions from positive to negative or from negative to positive as the number of zero crossings, detecting the fingerprint feature from the number of zero crossings and outputting the fingerprint feature as a result of detection 205. Each of the units 203, 204 and 205 is implemented by a program for instance.

Now, an operation of the first embodiment shown in FIG. 1 will be described with reference to FIG. 3, in which an angle between a tangent direction and a horizontal direction at a certain point on a circle having a mark point as its center is defined as being $\theta_1$, an angle between a ridge direction and the horizontal directions at the same point being $\theta_2$, a vector representing the tangent line being $(R_1 \cos 2\theta_1, R_1 \sin 2\theta_1)$ and a vector representing the ridge being $(R_2 \cos 2\theta_2, R_2 \sin 2\theta_2)$, where $R_1$ and $R_2$ are arbitrary constants and $\theta_1$ and $\theta_2$ are in a range from 0 to $\pi$, respectively. An inner product of these two vectors becomes as follows: $R_1 R_2$ (cos $2\theta_1$ cos $2\theta_2 + \sin 2\theta_1 \sin 2\theta_2) = R_1R_2 \cos(\theta_2-\theta_1)$ From this equation, it is clear that the inner product of two vectors has the maximum value $R_1R_2$ when the tangent line and the ridge are in the same direction and the minimum value $-R_1R_2$ when the tangent line is orthogonal to the ridge. Therefore, putting the angle $\phi$ of a radius of the circle with respect to the horizontal line on an abscissa and inner product on an ordinate, directional distributions of fingerprint features corresponding to the respective whorl, loop, periphery and delta are obtained as shown in FIG. 4. The directional distribution of ridges is represented here by f(h), where h is an integer in a range from 0 to (m−1) where m is an integer larger than 1, and thus the angle $\theta$ can be represented by $\theta=2\pi h/m$. The directional distribution of fingerprint f(h) is sampled at 0th point~(m−1)th point and then discrete-Fourier-expanded to obtain Fourier coefficients represented by the following equation (3).

$$a(k) = \frac{2}{m}\sum_{h=0}^{m-1} f(h)\cos 2\pi \frac{kh}{m} \quad \text{Equation (3)}$$

$$b(k) = \frac{2}{m}\sum_{h=0}^{m-1} f(h)\sin 2\pi \frac{kh}{m}$$

Power of the fingerprint feature for respective frequency components k can be obtained by calculating $a(k)^2+b(k)^2$ by using the Fourier coefficients a(k) and b(k). In a case where k=0, the power is $a(0)^2/4$.

Since, in the vicinity of whorl, loop, periphery and delta, strength values for k=0, 1, 2, 3 become large, it is possible to detect these features by comparison of the power values.

The directional distribution of ridges in the vicinity of the feature point is approximated by the following equation:

$$f(h) = A(k)\sin(2\pi kh/m + \phi)$$
$$= A(k)\sin\phi\cos(2\pi kh/m) + A(k)\cos\phi\sin(2\pi kh/m)$$

and the power of the frequency component k after Fourier expansion is modified as below:

$$a(k)^2+b(k)^2 = \{A(k)\sin\phi\}^2 + \{A(k)\cos\phi\}^2 = A(k)^2$$

Therefore, the power does not contain phase $\phi$ representing the rotation of the directional pattern of ridges, and thus the result of detection of fingerprint feature according to the present invention is not influenced by rotation of directional pattern of fingerprint.

Next, an operation of the second embodiment shown in FIG. 2 will be described. A directional distribution f(h) of fingerprint obtained as in the first embodiment is smoothed by obtaining an average value of f(h) for, for example, three successive h values and then the number of zero crossings is obtained. The zero crossing means a change of value from positive to negative or from negative to positive. Since the number of zero crossings is 0 in the case of whorl, 1 in the case of loop and 3 in the case of delta, it is possible to detect the respective fingerprint features by using the number of zero crossings. Since the number of zero crossings is not changed even if the directional pattern of fingerprint is rotated, the detection of a feature point according to the present invention is not influenced by rotation of the directional pattern of fingerprint.

Incidentally, in the fingerprint feature detecting apparatus shown in FIG. 1, it is possible to provide a smoothing unit similar to the smoothing unit 203 shown in FIG. 2 between the directional distribution producing unit 102 and the Fourier expansion unit 103. In such case, the smoothing unit divides the directional distribution of ridges supplied from the directional distribution producing unit 102 into a plurality of partial distributions, smooths or averages the respective partial distributions and sends the smoothed partial distributions to the Fourier expansion unit 103, as in the case of the smoothing unit 203 shown in FIG. 2. When there is no such smoothing unit provided and if the directional distribution of ridges contains noise, the same noise is given to the Fourier expansion unit 103 as it is, so that a result of Fourier expansion contains an error. On the contrary, with such smoothing unit, it is possible to reduce an effect of noise on the result of Fourier expansion performed by the Fourier expansion unit 103 to thereby reduce noise contained in the result of Fourier expansion.

Here, the operations of the first and second embodiments shown in FIGS. 1 and 2 will be described in more detail.

In implementing the present invention, it is necessary to cut out a 7×7 directional pattern centered at the mark point from the directional pattern of ridges shown in FIG. 18. Typical directional patterns of ridges in the vicinities of respective feature points called whorl, loop and delta, and an area called periphery are shown in FIG. 5.

First, the first embodiment shown in FIG. 1 will be described with reference to flowcharts shown in FIGS. 6 to 9.

Figure 6:
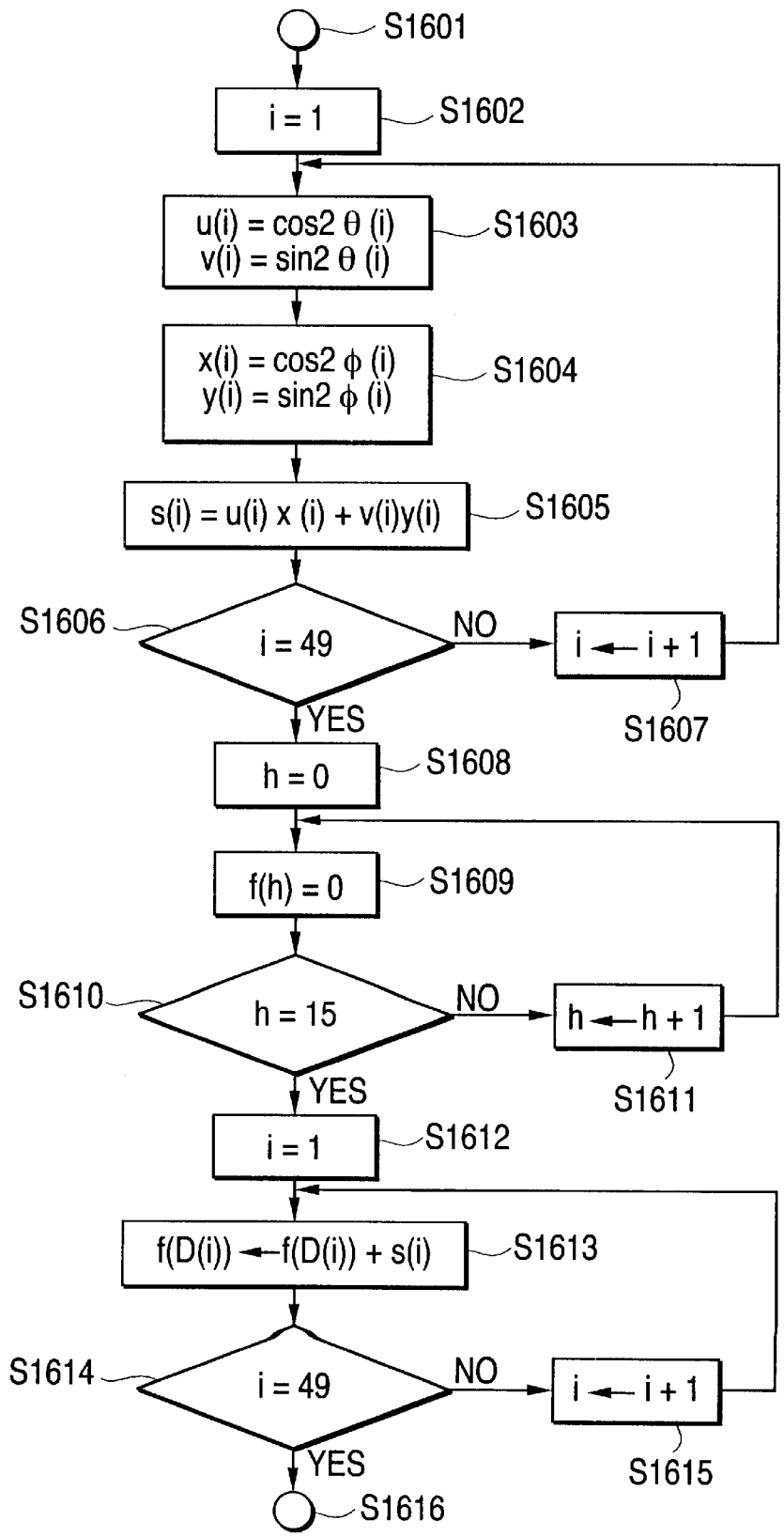
FIG. 6 is a flowchart showing operations of a directional distribution producing unit 102 of the first embodiment of the present invention and a directional distribution producing unit of the second embodiment of the present invention.

Referring to FIG. 6 which shows the flowchart showing the operation of the directional distribution producing unit 102, the directional distribution producing unit 102 sets, in the step S1602, a value i indicative of a position on the 7×7 directional pattern of fingerprint to 1. In the step S1603, a vector (u(i), v(i)) is obtained by using angle $\theta(i)$ between a direction of a ridge at the position i and a horizontal direction.

u(i)=cos 2θ(i)
v(i)=sin 2θ(i)

Figures 10, 11:
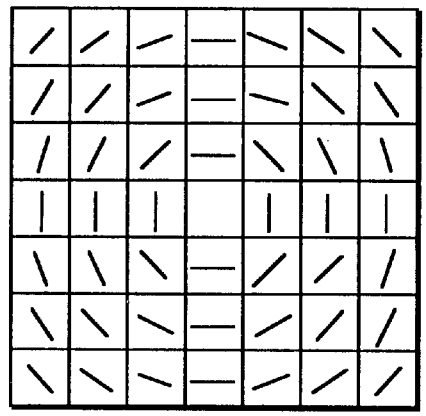
FIG. 10 is a table for explaining operations and effects of the embodiments of the present invention.
FIG. 11 is another table for explaining operations and effects of the embodiments of the present invention.

In the step S1604, a vector (x(i), y(i)) is obtained by using angle $\theta(i)$ between a line segment in a position i of a concentric filter shown in FIG. 10 and a horizontal direction.

x(i)=cos 2θ(i)
y(i)=sin 2θ(i)

Since the values of x(i) and y(i) can be calculated preliminarily as shown in FIGS. 11 and 12, respectively, it is enough to refer these values in the step S1604. In the step S1605, an inner product s(i) of the vectors (u(i), v(i)) and (x(i), y(i)) at the position 1 is obtained according to the following equation:

$$s(i)=u(i)x(i)+v(i)y(i)$$

In the step S1606, it is decided whether or not the inner products s(i) for the whole area of the 7×7 area are calculated. If yes, that is, when the position i=49, the processing is shifted to the step S1608. Otherwise, the value of i is incremented by 1 in the step S1607 and then the processing is returned to the step S1603.

In the steps S1608 to 1611, the value of f(h) for h=0~15 is set to 0.

In the step S1612, the value i indicative of the position on the 7×7 directional pattern is set to 1. In the steps S1613 to S1615, a sum of the inner product values s(i) for each of quantized 16 directions h=0~15 is obtained. That is, the directional distribution f(h) of ridges is obtained by obtaining a total sum of the inner product values s(i).

Figure 7:
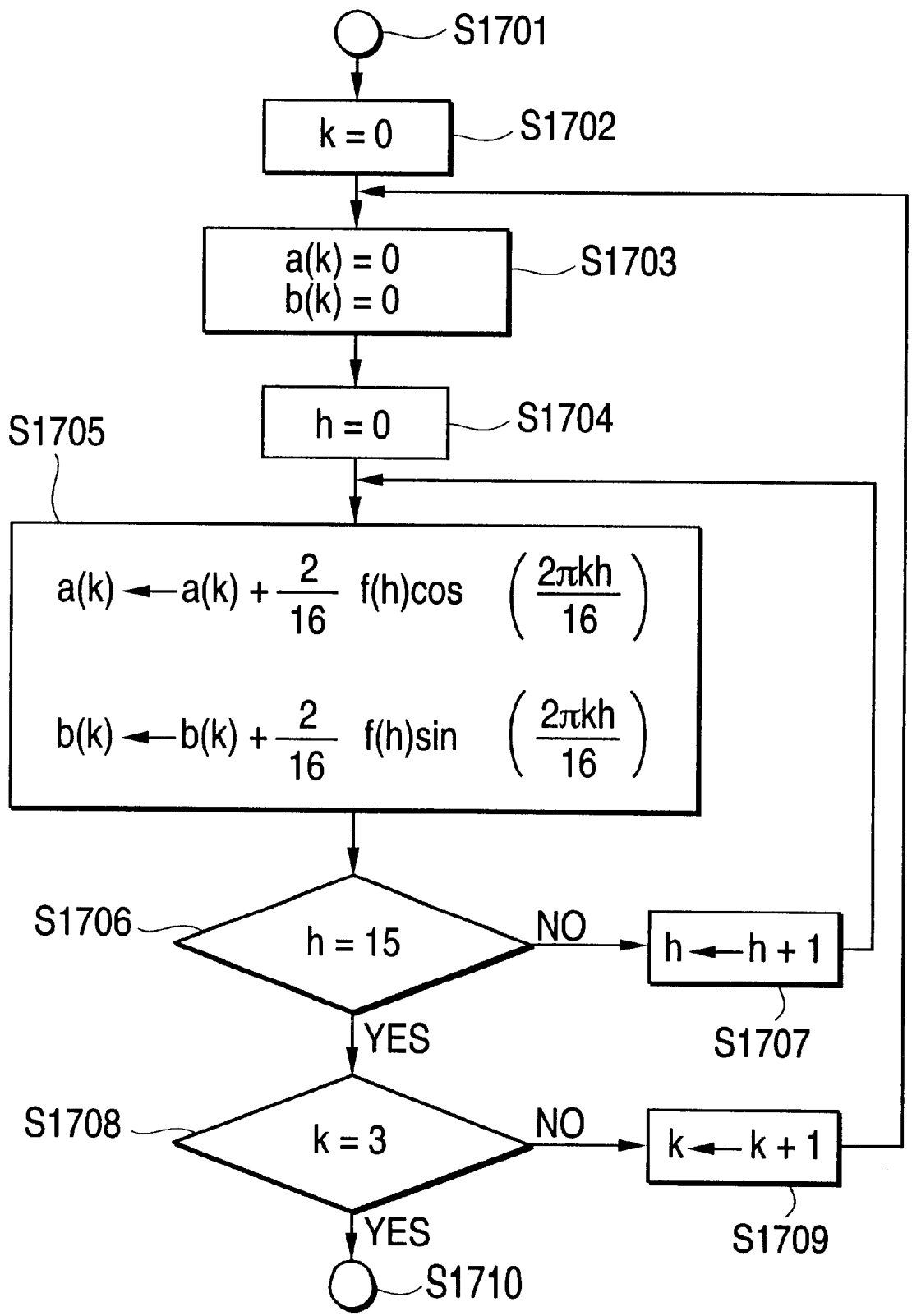
FIG. 7 is a flowchart showing an operation of a Fourier expansion unit 103 of the first embodiment of the present invention.

FIG. 7 is a flowchart showing the operation of the Fourier expansion unit 103. In the step S1702, the frequency component k is set to 0. In the step S1703, the Fourier coefficients a(k) and b(k) are set to 0. In the steps S1704 to S1707, the Fourier coefficients a(k) and b(k) are calculated by using the directional distribution f(h) for the quantized 16 directions according to the following equation (4):

$$a(k) = \frac{1}{16}\sum_{h=0}^{15} f(h) \cos2\pi\frac{kh}{16}$$

$$b(k) = \frac{1}{16}\sum_{h=0}^{15} f(h) \sin2\pi\frac{kh}{16}$$

Equation (4)

In the step S1708, it is decided whether or not Fourier coefficients have been calculated up to the frequency component k=3. If k<3, after k is incremented by 1 in the step S1709, the processing is returned to the step S1703. If k=3, the processing completes.

Figure 8:
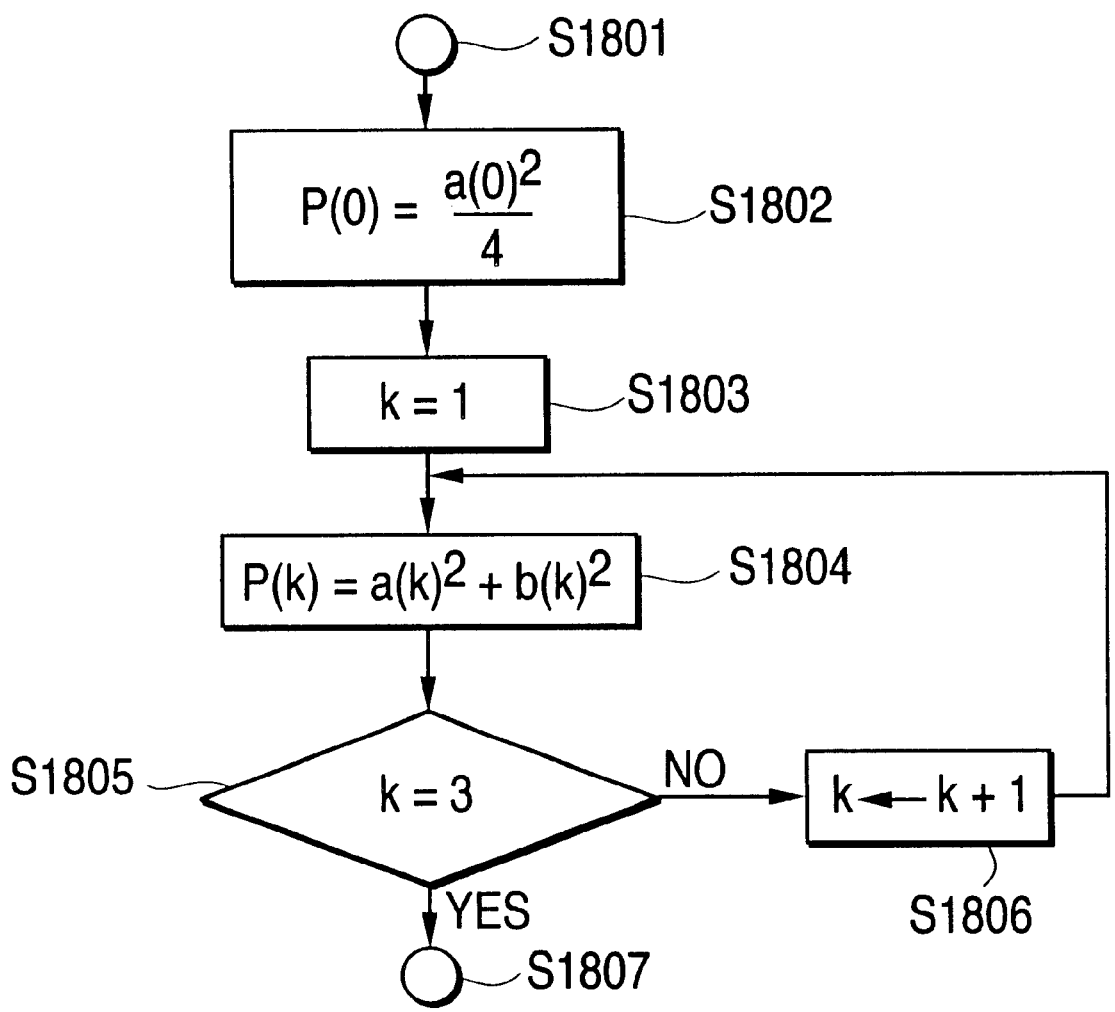
FIG. 8 is a flowchart showing an operation of a power calculation unit 104 of the first embodiment of the present invention.

FIG. 8 is a flowchart showing the operation of the power calculation unit 104. In the step S1802, power P(0) at k=0 is calculated by using the Fourier coefficient a(0). In the steps S1803 to S1806, power P(k) at k=1~3 are calculated by using Fourier coefficients a(k) and b(k).

Figure 9:
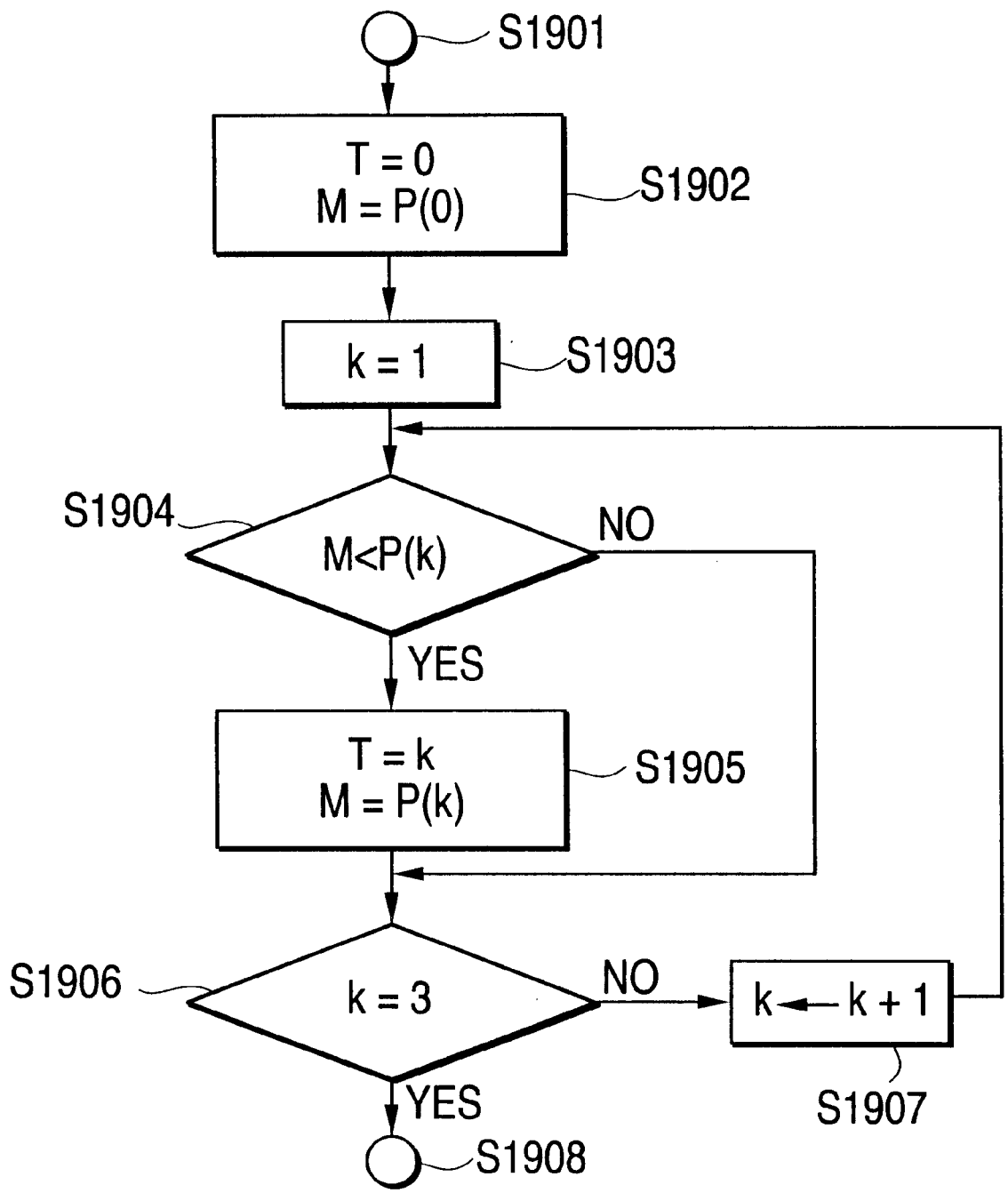
FIG. 9 is a flowchart showing an operation of a power determination unit 105 of the first embodiment of the present invention.

FIG. 9 is a flowchart showing the operation of the power determination unit 105. In the step S1902, a value T indicative of the detection result is made 0 and M is made power P(0) at k=0. In the steps S1903 to S1907, the power P(k) for the frequency component k is compared with M and, ultimately, the maximum value of power P(k) for k=0~3 is put as M and the value of k at that time is put as T. At the time when the processing completes, whorl is detected as the fingerprint feature if the value of T is 0, loop if 1 and delta if 3. When T=2, it is deemed as no feature detected.

The operation of the second embodiment will be described with reference to flowcharts shown in FIGS. 14 and 15. The flowchart showing the operation of the directional distribution producing unit 202 is the same as that shown in FIG. 6 and the directional distribution producing unit 202 outputs the directional distribution f(h) (h=0~15) of ridges for the quantized 16 directions.

Figure 14:
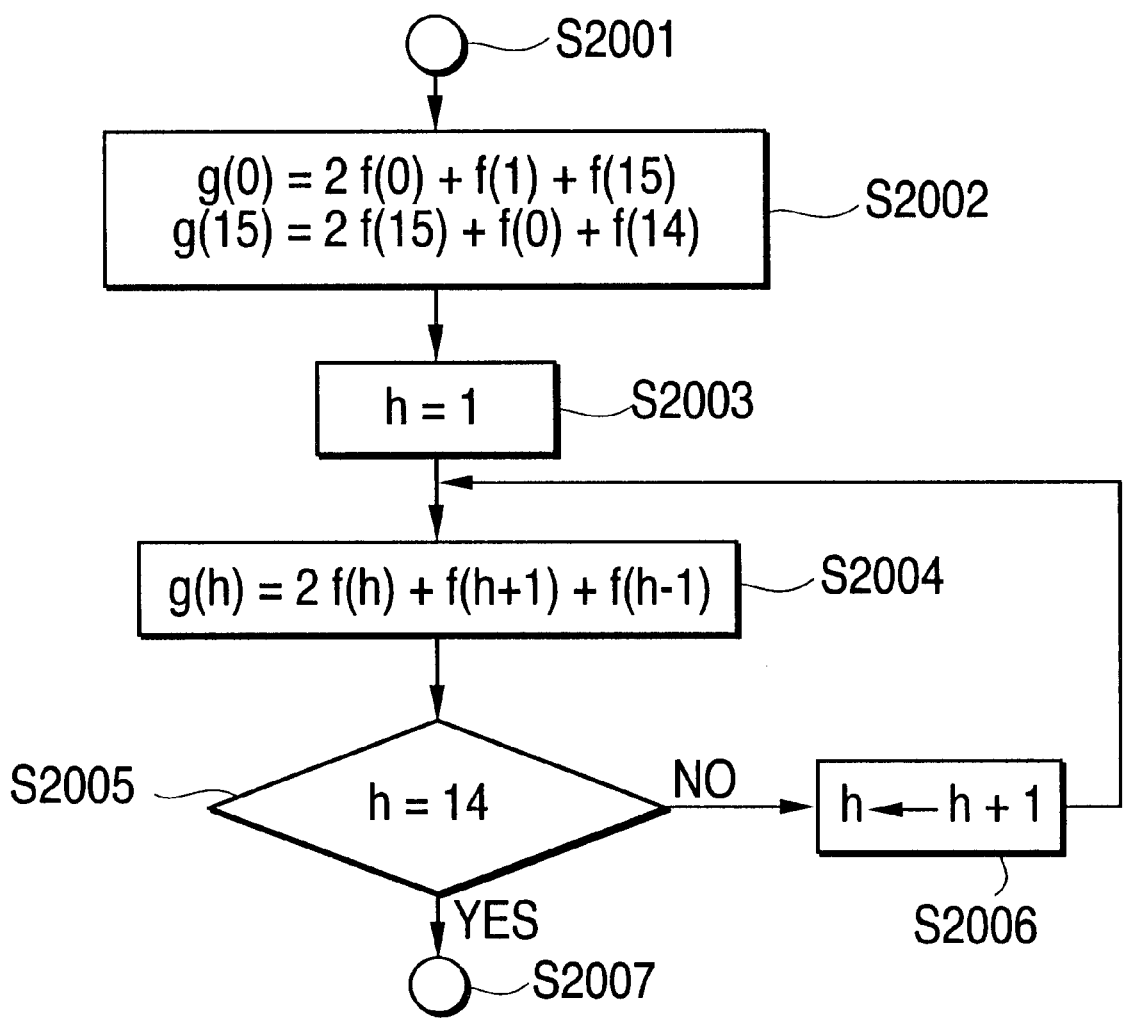
FIG. 14 is a flowchart showing an operation of a smoothing unit 203 of the second embodiment of the present invention.

FIG. 14 is a flowchart showing the operation of the smoothing unit 203. In the step S2002, smoothed directional distributions g(0) and g(15) are obtained. In the steps S2003 to S2006, g(h) for h=1~14 are obtained.

Figure 15:
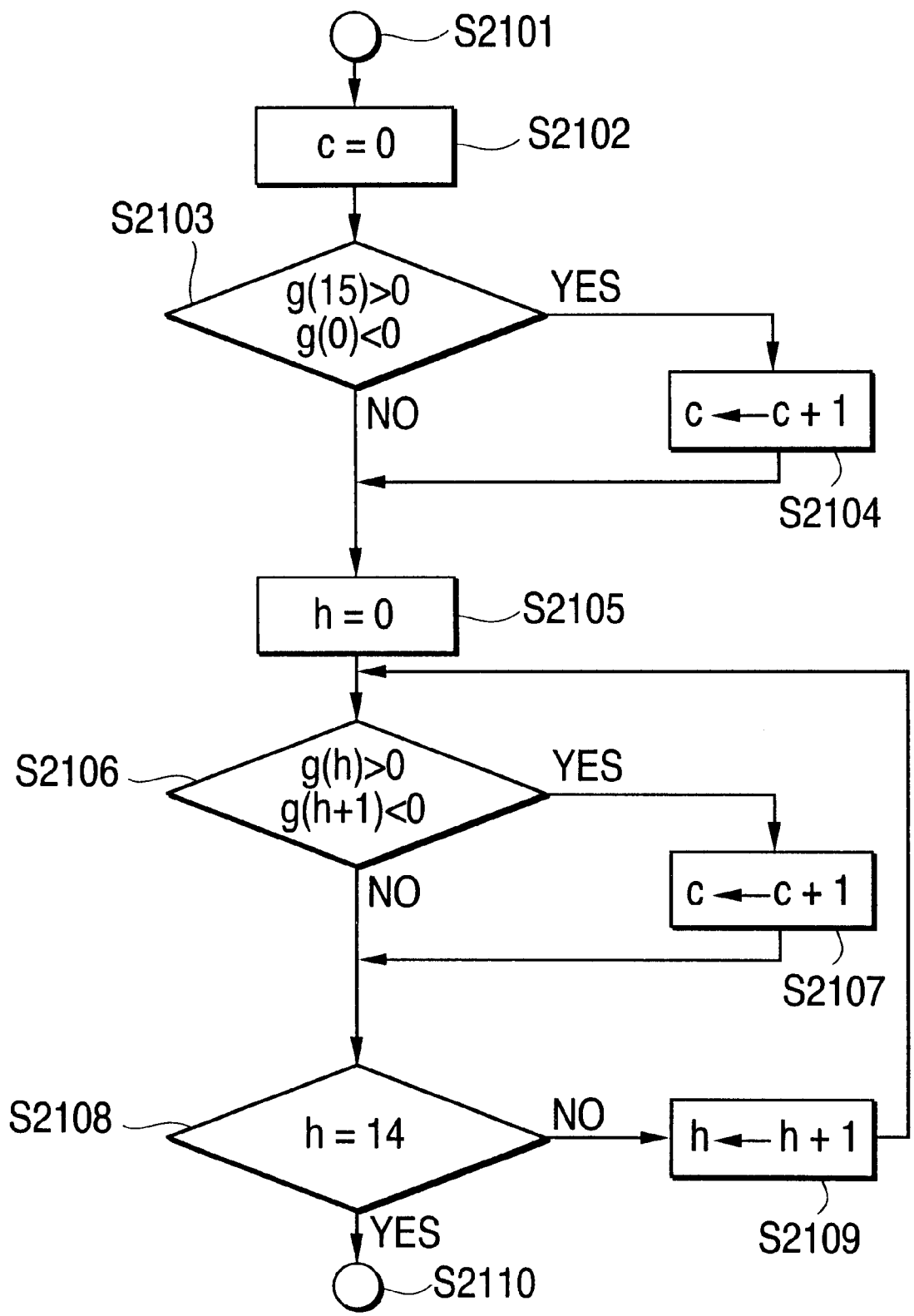
FIG. 15 is a flowchart showing an operation of a zero crossing detection unit 204 of the second embodiment of the present invention.
Figure 19:
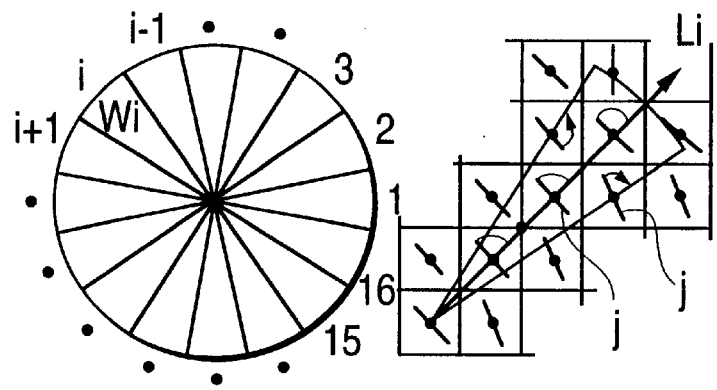
FIG. 19 is a diagram for explaining an operation of the prior art apparatus.
Figure 20:
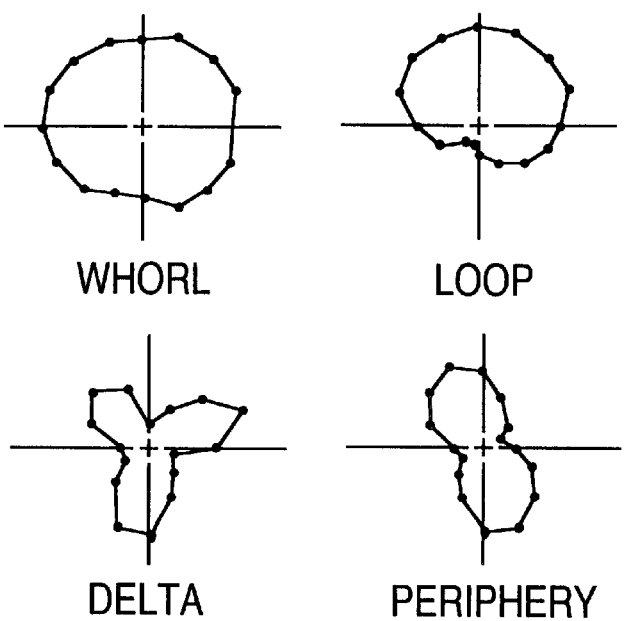
FIG. 20 shows an example of directional distribution pattern obtainable by the prior art apparatus.
Figure 21:
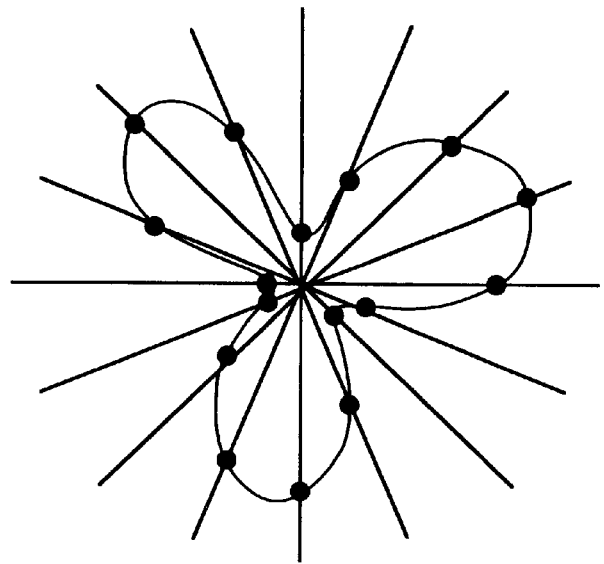
FIG. 21 is a diagram for explaining problems inherent to the prior art.
Figure 22:
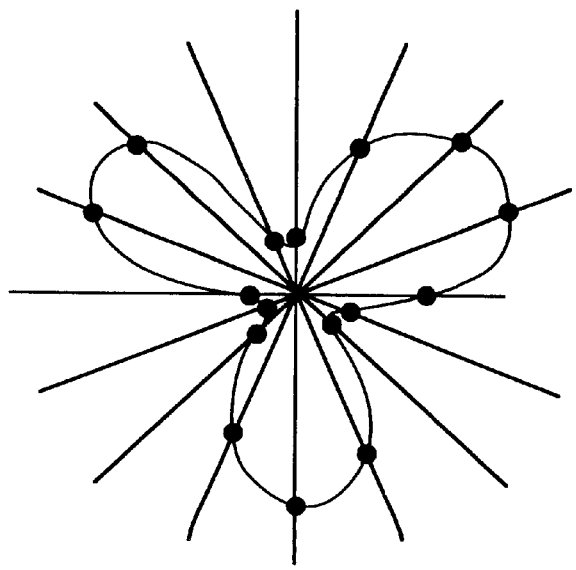
FIG. 22 is another diagram for explaining the problems inherent to the prior art.

FIG. 15 is a flowchart showing the operation of the zero crossing detection unit 204. In the step S2102, a value c indicative of a zero crossing point is set to 0. In the steps S2103 to 2104, the value of c is incremented by 1 when g(15) is positive and g(0) is negative. In the steps S2105 to S2109, changes of sign of g(h) and g(h+1) for h=0~14 and the value of c is incremented by 1 when g(h) is positive and g(h+1) is negative. Whorl is detected as a fingerprint feature when the value of c after the processing completes is 0, loop when 1 and delta when 3. When c=2, it is deemed as no feature detected.

The fingerprint feature detecting method of the present invention has been described. Although, in the embodiment, the present invention has been described by using the 7×7 concentric pattern, the present invention is effective for other patterns having different size. Further, although the power determination unit 105 detects, among the frequency components k=0~3, k with which the power P(k) is maximum, it is possible to set a suitable threshold value for each k and to detect a fingerprint feature corresponding to power P(k) when power P(k) is larger than the threshold value. Further, in the processing of the zero crossing detection unit 204, it is easily predictable that the present invention is effective even by using the number of protrusions and valleys instead of the number of zero crossings.

Effects of the embodiments shown in FIGS. 1 and 2 will be described.

Figure 4:
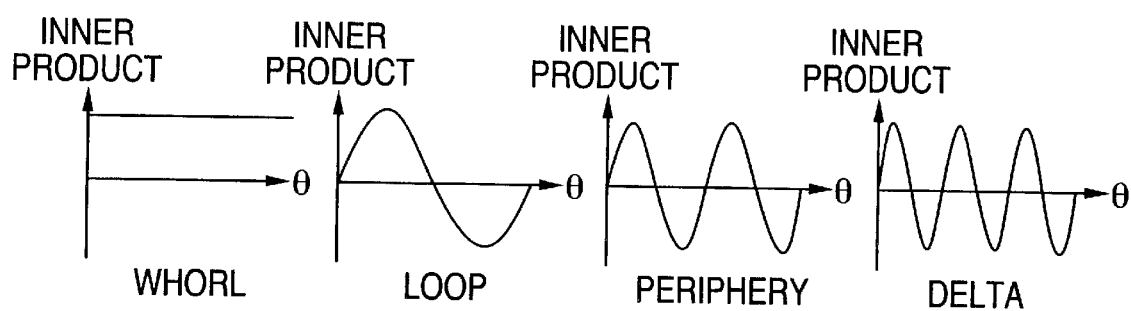
FIG. 4 is another diagram for illustrating a working of the present invention.

Since, in FIG. 3, the angle $\phi$ between a normal line direction of circle and a horizontal direction is given as $\theta=\theta_1-\pi/2$ where $\theta_1$ is the angle between tangent line direction and the horizontal direction, a vector in the normal direction becomes as follow:

($R_1 \cos 2\theta$, $R_1 \sin 2\theta$)=−($R_1 \cos 2\theta_1$, $R_1 \sin 2\theta_1$)

That is, since the directional distribution obtained by using the vector in the normal line of circle is the same as that obtained by using the vector in the tangent line of the circle with the sign being inverted, the power value after Fourier expansion is the same as that in the case where the tangent vector is used. That is, the same result of fingerprint feature detection as that obtained by the concentric pattern can be obtained by using a radial pattern shown in FIG. 16 which is orthogonal to the concentric pattern shown in FIG. 10. Therefore, the present invention is also effective in the case where the radial pattern is used.

An outer product of the tangent direction of a circle and the direction of ridges becomes $R_1R_2(\cos 2\theta_1 \sin 2\theta_2+\sin 2\theta_1 \cos 2\theta_2)=R_1R_2 \sin(\theta_2-\theta_1)$ That is, this value becomes 0 when the tangent line and the ridge are in the same direction or orthogonal to each other, and becomes $R_1R_2$ or $-R_1R_2$ when the angle between the tangent line and the ridge is ±45 degrees. Therefore, the directional distribution of whorl becomes always 0. However, since similar directional distribution to that obtained by inner product can be obtained for loop, delta and periphery, it is possible to detect other features than whorl by Fourier-expanding them and obtaining power for every frequency component or obtaining the number of zero crossings. Therefore, the present invention is also effective in such a case. The present invention is, of course, effective in the case where the directional distribution is obtained by computing an outer product of the normal direction of circle and ridge direction.

The fingerprint feature detecting apparatus and method of the present invention are characterized by that the detection of fingerprint feature is performed on the basis of a directional distribution of fingerprint obtained by setting a plurality of points on a circle having a center corresponding to a mark point on a directional pattern of ridges, obtaining inner products of vectors indicating tangent lines and vectors indicating ridges at the respective points and providing a distribution of the inner products as a directional distribution of ridges, in the following manner. That is, as the first method, a Fourier expansion means Fourier-expands the directional distribution of ridges and outputs a Fourier coefficient for every frequency component, a power calculation means calculates the power of every frequency component on the basis of the Fourier coefficients, and a power determination means detects the fingerprint feature on the basis of the power of every frequency component. As a second method, a smoothing means divides the directional distribution of ridges into a plurality of partial distributions and smooths the respective partial distributions, and a zero cross detection means detects the number of changes of value of the plurality of the smoothed partial distributions from positive to negative or negative to positive as the number of zero crossings, and detects the fingerprint feature on the basis of the number of zero crossings.

The fingerprint feature detecting apparatus and method of the present invention, which are constructed as described do not require a preliminary preparation of standard pattern, do not depend on the rotation of a directional pattern of ridges, and are capable of maintaining high detection accuracy.

Although the present invention has been described in detail above in conjunction with the various preferred embodiments thereof, it will be appreciated by those skilled in the art that these embodiments have been provided solely for purpose of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A fingerprint feature detecting apparatus comprising:
    a first unit configured to set a plurality of points on a circumference of a circle having a center on a point on a directional pattern of ridges of a fingerprint, and to obtain a set of inner products, wherein each of the inner products is an inner product of a first vector along a tangent line of the circle and a second vector along the ridge at each of said plurality of points; and
    a second unit connected to the first unit and configured to detect a fingerprint feature on the basis of the set of inner products.

2. A fingerprint feature detecting apparatus as claimed in claim 1, wherein said second unit comprises:
    a Fourier expansion unit configured to Fourier-expand the directional pattern of ridges and to output a Fourier coefficient for every frequency component;
    a power calculation unit coupled to the Fourier expansion unit and configured to calculate power of every frequency component on the basis of the Fourier coefficients; and
    a power determination unit coupled to the power calculation unit and configured to detect the fingerprint feature on the basis of the power of every frequency component.

3. A fingerprint feature detecting apparatus as claimed in claim 1, wherein said second unit comprises:
    a Fourier expansion unit configured to Fourier-expand the directional pattern of ridges and to output a Fourier coefficient for every frequency component;
    a power calculation unit coupled to the Fourier expansion unit and configured to calculate power of every frequency component on the basis of the Fourier coefficients; and
    a power determination unit coupled to the power calculation unit and configured to detect whorl as the fingerprint feature when the power at the frequency component of zero is maximum, to detect loop as the fingerprint feature when the power at the frequency component of 1 is maximum, to detect no feature when the power at the frequency component of 2 is maximum, and to detect delta as the fingerprint feature when the power at the frequency component of 3 is maximum.

4. A fingerprint feature detecting apparatus as claimed in claim 1, wherein said second unit comprises:
    a smoothing unit configured to divide the directional pattern of ridges into a plurality of partial Ratterns and to smooth the respective partial patterns;
    a Fourier expansion unit coupled to the smoothing unit and configured to Fourier-expand the directional pattern of ridges and to output a Fourier coefficient for every frequency component;
    a power calculation unit coupled to the Fourier expansion unit and configured to calculate power of every frequency component on the basis of the Fourier coefficients; and
    a power determination unit coupled to the power calculation unit and configured to detect the fingerprint feature on the basis of the power of every frequency component.

5. A fingerprint feature detecting apparatus as claimed in claim 1, wherein said second unit comprises:
    a smoothing unit configured to divide the directional pattern of ridges into a plurality of partial patterns and to smooth the respective partial patterns;
    a Fourier expansion unit coupled to the smoothing unit and configured to Fourier-expand the directional pattern of ridges and to output a Fourier coefficient for every frequency component;
    a power calculation unit coupled to the Fourier expansion unit and configured to calculate power of every frequency component on the basis of the Fourier coefficients; and
    a power determination unit coupled to the power calculation unit and configured to detect whorl as the fingerprint feature when the power at the frequency component of zero is maximum, to detect loop as the fingerprint feature when the power at the frequency component of 1 is maximum, to detect no feature when the power at the frequency component of 2 is maximums, and to detect delta as the fingerprint feature when the power at the frequency component of 3 is maximum.

6. A fingerprint feature detecting apparatus as claimed in claim 1, wherein said second unit comprises:
    a smoothing unit configured to divide the directional pattern of ridges into a plurality of partial patterns and to smooth the respective partial patterns; and
    a zero cross detection unit coupled to the smoothing unit and configured to detect the number of changes of value of the plurality of the smoothed partial patterns from positive to negative or negative to positive as the number of zero crossings and to detect the fingerprint feature on the basis of the number of zero crossings.

7. A fingerprint feature detecting apparatus as claimed in claim 1, wherein said second unit comprises:
    a smoothing unit configured to divide the directional pattern of ridges into a plurality of partial patterns and to smooth the respective partial patterns; and
    a zero cross detection unit coupled to the smoothing unit and configured to detect the number of changes of value of the plurality of the smoothed partial patterns from positive to negative as the number of zero crossings, and to detect whorl as the fingerprint feature when the number of zero crossings is zero, to detect loop as the fingerprint feature when the number of zero crossings is 1, to detect no feature when the number of zero crossings is 2, and to detect delta as the fingerprint feature when the number of zero crossings is 3.

8. A fingerprint feature detecting apparatus as claimed in claim 1, wherein said second unit comprises:
    a smoothing unit configured to divide the directional pattern of ridges into a plurality of partial patterns and to smooth the respective partial patterns; and
    a zero cross detection unit coupled to the smoothing unit and configured to detect the number of changes of value of the plurality of the smoothed partial patterns from negative to positive as the number of zero crossings, and to detect whorl as the fingerprint feature when the number of zero crossings is zero, to detect loop as the fingerprint feature when the number of zero crossings is 1, to detect no feature when the number of zero crossings is 2, and to detect delta as the fingerprint feature when the number of zero crossings is 3.

9. A fingerprint feature detecting apparatus comprising:

a first unit configured to set a plurality of points on a circumference of a circle having a center at a point on a directional pattern of ridges of a fingerprint, to derive a vector along a tangent line of the circle at each of said plurality of points from a table storing preliminary calculated vectors along the tangent lines of the circle, and to obtain a set of inner products, wherein each of the inner products is an inner product of the derived vector and a vector along the ridge at each of said plurality of points; and a second unit connected to the first unit,and configured to detect a fingerprint feature on the basis of the set of inner products.

10. A fingerprint feature detecting method comprising:

a first step of setting a plurality of points on a circumference of a circle having a center on a point on a directional pattern of ridges of a fingerprint, and obtaining a set of inner products, wherein each of the inner products is an inner product of a first vector along a tangent line of the circle and a second vector along the ridge at each of said plurality of points; and a second step of detecting a fingerprint feature on the basis of the set of inner products.

11. A fingerprint feature detecting method as claimed in claim 10, wherein said second step comprises:

a Fourier expansion step of Fourier-expanding the directional pattern of ridges and outputting a Fourier coefficient for every frequency component;

a power calculation step of calculating power of every frequency component on the basis of the Fourier coefficients; and a power determination step of detecting the fingerprint feature on the basis of the power of every frequency component.

12. A fingerprint feature detecting method as claimed in claim 10, wherein said second step comprises:

a Fourier expansion step of Fourier-expanding the directional pattern of ridges and outputting a Fourier coefficient for every frequency component;

a power calculation step of calculating power of every frequency component on the basis of the Fourier coefficients; and a power determination step of detecting whorl as the fingerprint feature when the power at the frequency component of zero is maximum, detecting loop as the fingerprint feature when the power at the frequency of 1 is maximum, detecting no feature when the power at the frequency component of 2 is maximum, and detecting delta as the fingerprint feature when the power at the frequency component of 3 is maximum.

13. A fingerprint feature detecting method as claimed in claim 10, wherein said second step comprises:

a smoothing step of dividing the directional pattern of ridges into a plurality of partial patterns and smoothing the respective partial patterns;

a Fourier expansion step of Fourier-expanding the directional pattern of ridges and outputting a Fourier coefficient for every frequency component;

a power calculation step of calculating power of every frequency component on the basis of the Fourier coefficients; and a power determination step of detecting the fingerprint feature on the basis of the power of every frequency component.

14. A fingerprint feature detecting method as claimed in claim 10, wherein said second step comprises:

a smoothing step of dividing the directional pattern of ridges into a plurality of partial patterns and smoothing the respective partial patterns;

a Fourier expansion step of Fourier-expanding the directional pattern of ridges and outputting a Fourier coefficient for every frequency component;

a power calculation step of calculating power of every frequency component on the basis of the Fourier coefficients; and a power determination step of detecting whorl as the fingerprint feature when the power at the frequency component of zero is maximum, detecting loop as the fingerprint feature when the power at the frequency component of 1 is maximum, detecting no feature when the power at the frequency component of 2 is maximum, and detecting delta as the fingerprint feature when the power at the frequency component of 3 is maximum.

15. A fingerprint feature detecting method as claimed in claim 10, wherein said second step comprises:

a smoothing step of dividing the directional pattern of ridges into a plurality of partial patterns and smoothing the respective partial patterns; and a zero cross detection step of detecting the number of changes of value of the plurality of the smoothed partial patterns from positive to negative or negative to positive as the number of zero crossings, and detecting the fingerprint feature on the basis of the number of zero crossings.

16. A fingerprint feature detecting method as claimed in claim 10, wherein said second step comprises:

a smoothing step of dividing the directional pattern of ridges into a plurality of partial patterns and smoothing the respective partial patterns; and a zero cross detection step of detecting the number of changes of value of the plurality of the smoothed partial patterns from positive to negative as the number of zero crossings, and detecting whorl as the fingerprint feature when the number of zero crossings is zero, detecting loop as the fingerprint feature when the number of zero crossings is 1, detecting no feature when the number of zero crossings is 2, and detecting delta as the fingerprint feature when the number of zero crossings is 3.

17. A fingerprint feature detecting method as claimed in claim 10, wherein said second step comprises:

a smoothing step of dividing the directional pattern of ridges into a plurality of partial patterns and smoothing the respective partial patterns; and a zero cross detection step of detecting the number of changes of value of the plurality of the smoothed partial patterns from negative to positive as the number of zero crossings, and detecting whorl as the fingerprint feature when the number of zero crossings is zero, detecting loop as the fingerprint feature when the number of zero crossings is 1, detecting no feature when the number of zero crossings is 2, and detecting delta as the fingerprint feature when the number of zero crossings is 3.

18. A fingerprint feature detecting method comprising:

a first step of setting a plurality of points on a circumference of a circle having a center at a point on a directional pattern of ridges of a fingerprint, deriving a vector along a tangent line of the circle at each of said plurality of points from a table storing preliminary calculated vectors along the tangent lines of the circle, and obtaining a set of inner products, wherein each of the inner products is an inner product of the derived vector and a vector along the ridge at each of said plurality of points; and a second step of detecting a fingerprint feature on the basis of the set of inner products.

\* \* \* \* \*